United States Patent [19]

Shaffer et al.

[11] Patent Number: 6,125,108

[45] Date of Patent: Sep. 26, 2000

[54] METHOD AND SYSTEM FOR ENHANCED CLIENT IDENTIFICATION

[75] Inventors: Shmuel Shaffer, Palo Alto; William Joseph Beyda, Cupertino, both of Calif.

[73] Assignee: Siemens Information and Communication Networks, Inc., Boca Raton, Fla.

[21] Appl. No.: 09/054,856

[22] Filed: Apr. 2, 1998

[51] Int. Cl.[7] .................................................. H04L 12/16
[52] U.S. Cl. .......................................... 370/259; 379/201
[58] Field of Search .................................. 370/524, 352, 370/353, 270, 385, 259, 355, 354; 379/201, 210, 211, 212, 215, 93.25; 455/414, 415, 416, 417; 707/1, 2, 3, 5, 10; 709/212, 213, 214, 217, 219, 245

[56] References Cited

U.S. PATENT DOCUMENTS

| | | | |
|---|---|---|---|
| 5,012,466 | 4/1991 | Buhrke et al. | 370/62 |
| 5,206,899 | 4/1993 | Gupta et al. | 379/120 |
| 5,473,679 | 12/1995 | La Porta et al. | 379/201 |
| 5,657,377 | 8/1997 | Pinard et al. | 379/93.02 |
| 5,819,178 | 10/1998 | Cropper | 455/433 |
| 5,937,056 | 8/1999 | Coyne et al. | 379/221 |
| 5,987,108 | 11/1999 | Jagadish et al. | 379/114 |

*Primary Examiner*—Douglas W. Olms
*Assistant Examiner*—Ken Vanderpuye

[57] ABSTRACT

A method and system for client identification include a control unit configured to enable call service features in communication devices supported by the control unit. A first communication device transmits an off-hook message to the call control unit with a first memory-space physical address locally accessed from memory associated with the first communication device. The first physical address represents a location in main memory of call service profile data associated with the first communication device. The control unit responds to the first physical address by accessing a first data set from the main memory. A verification program determines whether the first data set includes the first call service profile. The control unit enables a first set of call services indicated by the first call service profile data for the first communication device if the first call service profile is included in the first data set. If the first data set does not include the first call service profile data, the control unit searches for a current address of the first call service profile, transmits the current address to the first communication device, and accesses the first call service profile from the current address before enabling the first set of call services. In a preferred embodiment, the first communication device locally stores call service profile addresses for a local communication device and a remotely located communication device. The call control unit is configured to enable call services in the local and remotely located communication devices in response to receiving the call service profile addresses for the local and remotely located communication devices in call-setup messages transmitted by the first communication device.

16 Claims, 6 Drawing Sheets

METHOD AND SYSTEM FOR ENHANCED CLIENT IDENTIFICATION

BACKGROUND OF THE INVENTION

The invention relates generally to a method and system for establishing communication links and more specifically to a method and system for providing high efficiency client identification during establishment of a communication link.

BACKGROUND OF THE RELATED ART

In many telecommunication systems, terminals can be provisioned with a particular set of call services which are usually stored in a central location, such as a central office of a telephone company or a server supporting internet protocol (IP) telephony. Services such as call waiting, caller ID, and flexible calling can be subscribed to by users, and the collection of services subscribed to by a particular user constitutes user service profile data. Some switching systems store service profile data defining call services for a particular user based on an equipment number associated with the line connecting the terminal to the switching system. Such a per-line call service definition is ineffective for a multipoint arrangement, because it requires all users on a given digital line to have identical services. However, in an integrated services digital network (ISDN), a single basic rate interface (BRI) line can support up to eight ISDN terminals, each terminal being assigned a different user service profile. A local area network (LAN) can likewise have multiple terminals with different user service profiles on a single system bus.

One approach to providing individually defined call services for terminals on a multipoint interface is described in U.S. Pat. No. 5,012,466 to Buhrke et al. An ISDN switching system stores multiple service profiles, each profile defining features subscribed to by a user. The services defined by a service profile are enabled for a terminal in a multipoint configuration in response to transmission by the terminal of both a first identifier defining the terminal and a second identifier defining a particular service profile for the terminal. Service profile data is stored in a database accessible to a central office processor. The processor performs a search to determine a physical address of the service profile data upon receiving the first and second identifiers in order to access the user service profile data prior to establishing the call. Once the processor has accessed the user service profile data, the central office enables the call services to which the user has subscribed, and call-setup can proceed. For instance, if the user subscribes to call waiting, the call waiting service will be activated, so the user will be alerted of any incoming calls while a current call is in progress.

The process of searching for the physical address of a user's service profile during call-setup consumes considerable processing power and limits the performance of a telecommunication system. In the case of an ISDN central office, the performance, as measured by the Busy Call Hour Call Attempts, is limited by the repetitive search for user service profile addresses performed during each call-setup. In an IP telephony environment, a LAN server already supporting conventional applications might not provide the additional processing power necessary to also support IP telephony. Furthermore, a server dedicated to supporting IP-telephony is forced to waste valuable processing power by performing repetitive searches.

What is needed is a system and method for providing an efficient and reliable telephonic client identification capability during a call-setup procedure.

SUMMARY OF THE INVENTION

A system and method for accessing information identifying selected telephony services that are available to individual communication devices of a network of such devices include storing user service profiles in common within a main memory, but locally storing "pointers" to memory space at which particular user service profiles are stored. That is, physical addresses of the user service profiles are stored in local memory, enabling an individual communication device to identify the physical location in main memory at which the appropriate user service profile may be accessed.

Each user service profile includes an identification of a set of telephony service that are available to a specific communication device. The set may be all or a subset of the telephony services within the capabilities of the network. In the preferred embodiment, each communication device has local memory to store the memory-space physical address at which its user service profile is stored. Also in the preferred embodiment, the physical address is transmitted to the user communication device in response to a first access-requested message (e.g., an off-hook message) received from the user communication device. Initially, a search is performed to determine a first address of the user service profile and the physical address is transmitted to the user communication device to be entered into the local memory of the user communication device. Alternatively, the physical address can be transmitted to the user communication device upon first being entered into the main memory.

A second off-hook message which includes the physical address is automatically transmitted by the user communication device. A control unit responds to receipt of the second off-hook message by utilizing the physical address to access a first data set from the main memory. A verification program is used to determine whether the first data set includes the appropriate user service profile. If the main memory has not been reconfigured since the physical address was transmitted, the first data set will include the appropriate user service profile and the call-setup process continues. On the other hand, if a reconfiguration of the main memory has occurred in the interim, it is assumed that the user service profile is stored at another location in the main memory and that the first data set does not include the appropriate user service profile. If the first data set does not include the user service profile, the call control unit performs a second search to locate a current physical address. Upon determining the current address, the call control unit transmits the current address to the user communication device for storage in local memory. The call control unit utilizes the address to access the user service profile and enables a first set of telephony services determined by the user services profile of the user communication device.

In a preferred embodiment, upon detecting an incoming call, the call control unit is configured to enable call services in a local called-party communication device in response to receiving the appropriate memory-space physical address in a call-setup message. The call control unit uses the physical address to access a second data set which the verification program analyzes to determine whether the second data set includes the called-party service profile of the local called-party communication device. If the second data set does not include the proper called-party service profile, the call control unit performs a search to determine a current address of the called-party service profile and transmits the current address to the calling communication device. The control program utilizes the called-party service profile to enable the call services assigned to the called-party communication device.

For outgoing calls, the call control unit can also be configured to enable call services for a remotely located called-party communication device supported by a remotely located call control unit. The call services are enabled at the remote unit in response to receiving a memory-space physical location of the called-party service profile. The physical address is included in a second call-setup message. The local call control unit relays the second call-setup message received from the user communication device to the remotely located call control unit, together with instructions to use the physical address to access the called-party service profile and to enable the call services assigned to the called-party communication device.

In a preferred embodiment, the call control unit, the verification program, and the main memory are associated with a LAN server supporting IP-telephony. In other embodiments the call control unit, verification program, and main memory are associated with a PBX supporting digital and/or analog telephony, an ISDN central office, or an analog telephony central office.

DETAILED DESCRIPTION

Figure 1:
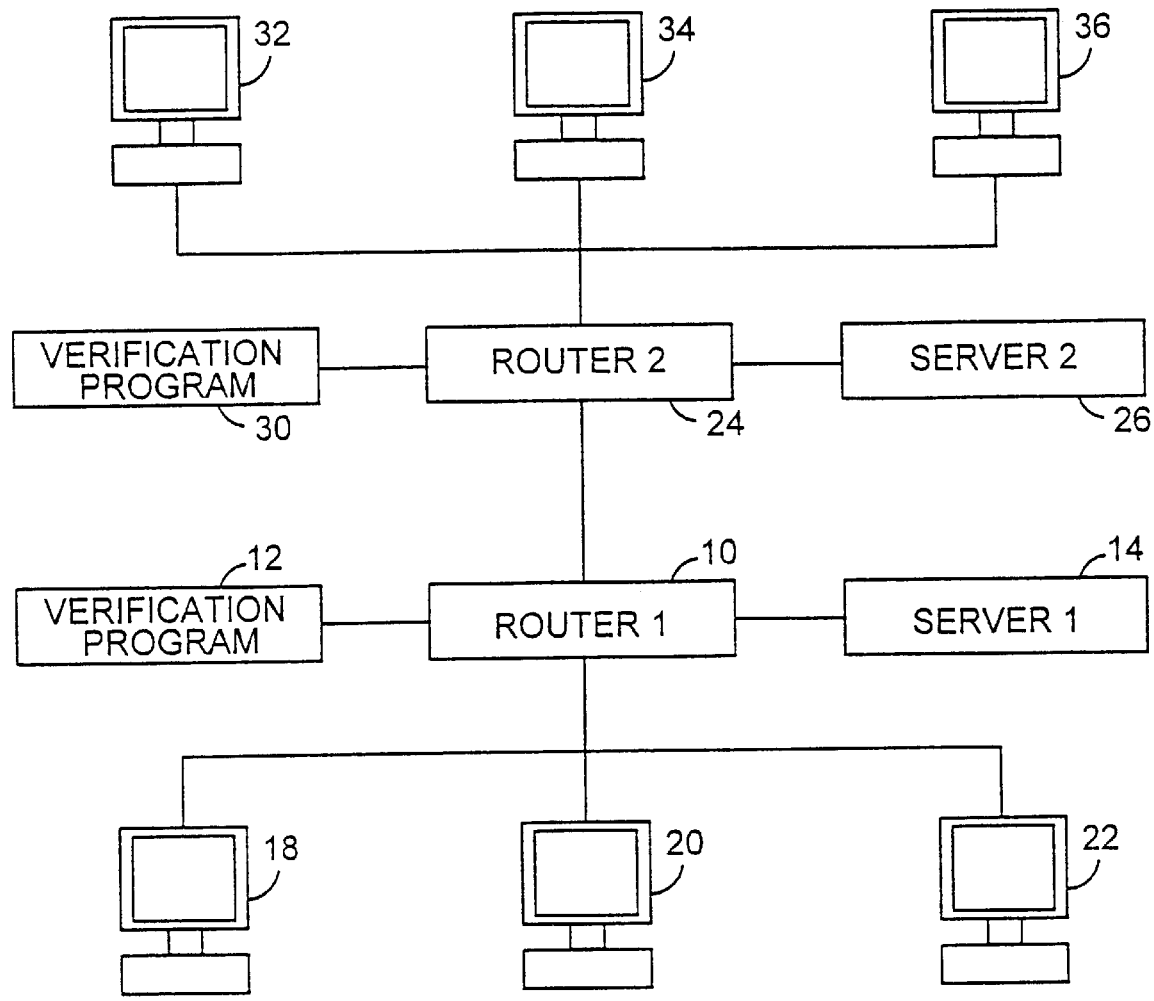
FIG. 1 is a block diagram of an IP-telephony embodiment of the enhanced client identification system of the present invention.

With reference to FIG. 1, a system for providing high efficiency client identification includes a first router 10 supporting IP-telephony devices 18, 20, and 22. The first router 10 includes a verification program 12 for verifying data identity of data accessed from a server 14. The first router 10 is connected to a second router 24, which includes a second control program, is connected to a second server 26, and supports IP-telephony devices 32, 34, and 36.

Each of the IP-telephony devices is provisioned with a set of call service features. For instance, the first IP-telephony device 18 may be enabled for call waiting and conference calling, the second IP-telephony device 20 may be enabled for video-teleconferencing capability, and the third IP-telephony device 22 may be enabled for all of these services. The collection of call services subscribed to by a particular user constitutes a user service profile. The user service profile for each IP-telephony device is stored in the server 14, which acts as main memory. Typically, such profiles are stored in a database format.

The user service profile is determined by a user and transmitted to the first router 10 with instructions to enter the user service profile data into the server 14. To initialize the second device 20 for video-teleconferencing, a user might transmit a request to the first router 10 to activate IP-telephony service. The first router 10 transmits a file to the second device 20 which allows the user to select from a menu of call service features. The user selects the video-teleconferencing as the sole call service feature to be enabled for the second IP-telephony device 20 and transmits the selection to the first router 10, which enters second device user service profile data into the server 14.

The physical address of the second user service profile can be transmitted to the second IP-telephony device 20 upon the profile being entered or, alternatively, the address might be subsequently transmitted upon receiving a first off-hook message from the second IP-telephony device 20. Subsequent to initialization, the first router 10 transmits a second identifier, which is associated with the second device service profile data stored in the server 14. The second identifier can be identical to identifiers that are conventionally utilized to locate the user service profile data of an IP-telephony device. This conventional identifier is used in the event that the server 14 is reconfigured and the second device service profile data is no longer stored at the same physical address. Both the service profile physical address and the second identifier are stored in local memory (not shown) in the second IP-telephony device 20.

Assuming the service profile physical address is not transmitted to the second IP-telephony device 20 upon initial storage of the user service profile in the server 14, the second IP-telephony device 20 is configured to include the second identifier in an off-hook message transmitted to the first router 10. The first router 10 performs a search for the address of the user service profile and transmits the address to the second IP-telephony device 20 to be stored in local memory of the device. The first router 10 accesses the second user service profile from the database of the server and enables the video-teleconferencing feature, as subscribed by the user of the second IP-telephony device 20. The first router 10 is configured to execute a call-setup routine, such as the call-setup signaling procedures described in the International Telecommunication Union H.323 standard to establish the IP-telephony video-teleconferencing link between the second and third devices 20 and 22.

Once the second IP-telephony device 20 has stored the physical second user service profile in local memory, the second IP-telephony device includes the address in subsequent off-hook messages transmitted to the first router 10, thereby saving the first router 10 the processing time conventionally required to perform a search for the address. When the first router 10 receives the off-hook message with the service profile physical address, the first router 10 retrieves a first data set from the server 14.

To illustrate by way of example, the third IP-telephony device 22, having already locally stored its service profile physical address, transmits an off-hook message to the first router 10, including the third device service profile physical address. If the database of the server 14 has not been reconfigured in the time between the original storage of the user service profile and the receipt of the call-setup message by the first router 10, the first data set accessed from the database will include the user profile assigned to the third IP-telephony device. If the database has been reconfigured in the interim, it is possible that the user service profile has been stored in another location within the server, so that the first data set does not include the appropriate user service profile. The verification program 12 associated with the first router 10 enables the first router to ascertain whether the first data set includes the user service profile data. This can be done by comparing an identifier in the retrieved data set with the second identifier that was transmitted with the off-hook message.

If the database of the server 14 has not been reconfigured, the verification program indicates that the user service profile is included in the first data set. The first router 10 enables the call service features subscribed to by the third IP-telephony device 22. If the database has been reconfigured and the user service profile is not included in the first data set, the first router 10 performs a search for the current address of the third device service profile, transmits the current address to the third device 22, and enables the call services identified in the user service profile.

In a preferred embodiment of the system, the first router 10 and server 14 are configured to respond to receiving a physical address of a called-party service profile from a calling party. In establishing an IP-telephony communication link between two devices of the same network, the first router 10 must access not only the user service profile of the calling party, it must also access the user service profile of the called party in order to enable the services subscribed to by the user of the called communication device. If the calling party transmits the calling device service profile address and the called device service profile address, the router 10 and server 14 are spared the processing time and resource allocation of performing two different searches for call service profile addresses.

For example, if the user of the second device 20 frequently calls the user of the third device 22, the second device 20 can be configured to transmit a request to the first router 10 for the physical address of the third device's service profile. The first router 10 transmits the third device's service profile address and the second device 20 stores the device's address in local memory. Thereafter, when the second device 20 transmits a call-setup message to the first router 10 for a video-teleconferencing link with the third device 22, the physical address of the third device service profile is included. The first router 10 accesses the service profile for the third device 22, determines that the third device has subscribed to the video-teleconferencing feature, and enables the video-teleconferencing service. If a reconfiguration of the database of server 14 has occurred and the physical location of the service profile data has changed, the first router 10 will perform a search to ascertain the current address of the service profile data of both the second and third devices 20 and 22 and will transmit both of the current addresses to the second device 20 and the current third device service profile address to the third device 22.

Furthermore, the first router 10 can be configured to respond to receiving a physical address of a called-party service profile from a calling party by enabling call services assigned to a remotely located called-party communication device. With continued reference to FIG. 1, the second device 20 has stored a user service profile address of the fifth IP-telephony device 34 in local memory. In addition to transmitting the physical address of the second device user service profile in an off-hook message, the second device 20 transmits the address of the fifth device service profile in a call-setup message. The first router 10 relays the call-setup message and the fifth device service profile physical address to the second router 24 with instructions directing the second router 24 to access a data set from the second server 26. The second verification program 30 ascertains whether the fifth user service profile is included in the data set accessed by the second router 24. If the data set does not include the fifth user service profile, the second router 24 performs a search for a current address, transmits the current address to the second device 20 to be stored in local memory, and accesses the fifth device service profile utilizing the current address. The second router 24 utilizes the fifth user service profile to enable call services subscribed to by the user of the fifth IP-telephony device. If the data set accessed by the second router 24 includes the fifth user service profile, the second router 24 need not perform a search. The second router 24 simply enables the call services in the fifth device indicated by the fifth user service profile data.

Figure 2:
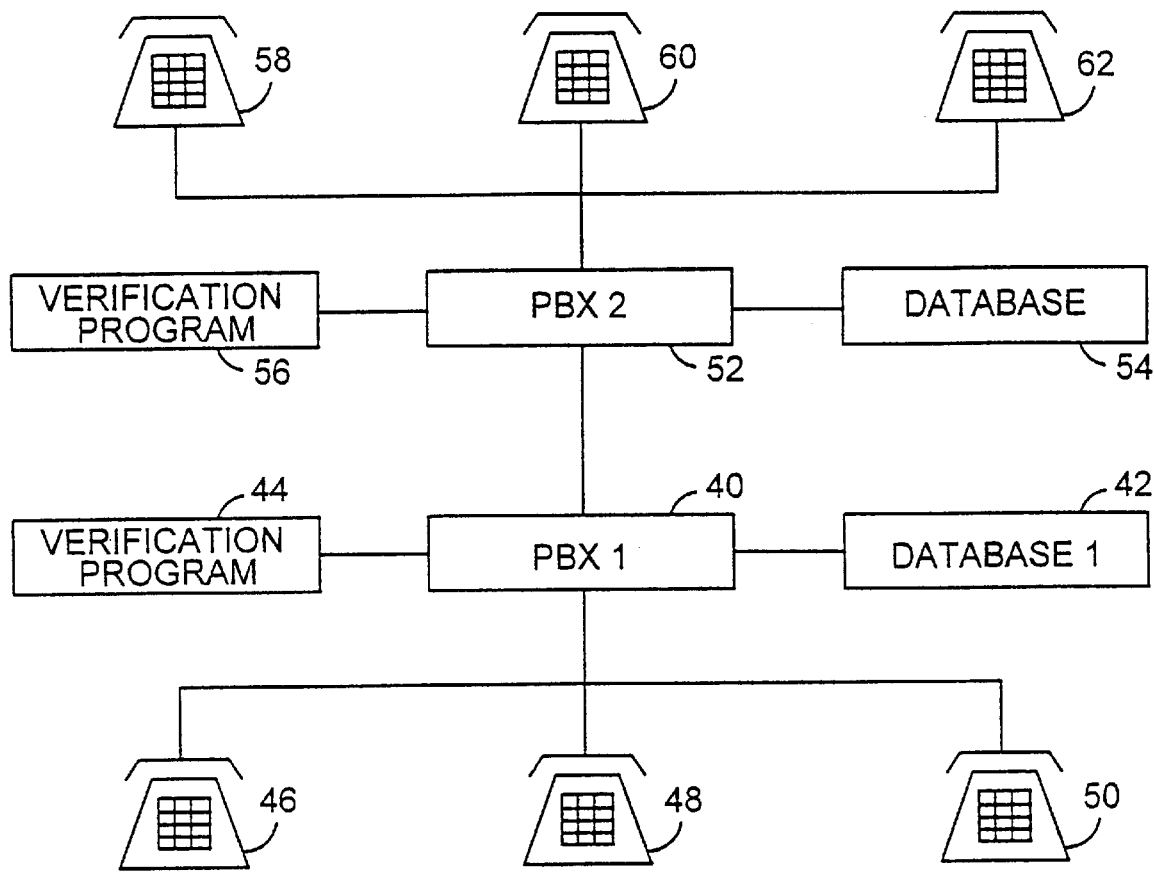
FIG. 2 is a block diagram of a PBX-supported embodiment of the enhanced client identification system.

With reference to FIG. 2, a system for high efficiency client identification employed in a PBX environment includes operatively coupled first and second PBXs 40 and 52. The first PBX 40 supports first, second, and third telephones 46, 48, and 50, and is associated with a first verification program 44 and a first database 42. The second PBX 52 supports fourth, fifth, and sixth telephones 58, 60, and 62, and is associated with a second verification program 56 and a second database 54. The databases are stored in main memory of the two exchanges (e.g., servers).

The first PBX 40 can enable call services in a local calling telephone, for example the first telephone 46, in response to receiving a physical address of a first service profile from the first telephone 46. When the first telephone 46 goes off-hook, it transmits an off-hook message to the first PBX 40. The first off-hook message that the first telephone 46 transmits after it is initialized includes a request for the physical address of the service profile associated with the first telephone 46. The first PBX 40 performs a search of the database 42 and transmits the physical address to the first telephone 46 for storage in local memory. Subsequent off-hook messages include the physical address, enabling the first PBX 40 to access a first data set from the first database 42.

The first verification program 44 determines whether the first data set includes the first service profile. As previously discussed, reconfiguration of the database can relocate the service profile to a different physical location in memory space. If the first verification program 44 determines that the first service profile is not included in the first data set, the PBX 40 performs a search for the current address for the first service profile, transmits the current address to the first telephone 46, accesses the first service profile, and enables the call services for the first telephone 46. If the first data set includes the first service profile, then the PBX 40 simply utilizes the first service profile to enable the call services for the first telephone 46.

The first telephone 46 can also be configured to locally store physical addresses for other local telephones supported by the first PBX 40 and/or remotely located phones supported by the second PBX 52. In a call placed to the second telephone 48, the first telephone 46 transmits a call-setup message to the first PBX 40 together with the address of the second telephone service profile in the first database 42. The first PBX 40 utilizes the address to access a data set which the first verification program 44 analyzes to determine if the data set includes the second telephone service profile. If the second telephone service profile is included in the data set, the first PBX 40 enables the call services for the second telephone 48 indicated by the second telephone service profile. If the data set does not include the second telephone service profile, the PBX 40 searches for a current second telephone service profile address and transmits the current address to the first and second telephones 46 and 48 for local storage prior to enabling the call services in the second telephone 48.

In a call from the third telephone 50 to the fourth telephone 58 supported by the second PBX 52, the third telephone 50 is configured to transmit a call-setup message with a memory-space physical address associated with the fourth telephone service profile stored in the second database 54. The first PBX 40 relays the call-setup message with the fourth telephone service profile address together with instructions to the second PBX 52 to utilize the address to access the fourth telephone service profile from the second database 54. The second verification program 56 ascertains whether the fourth telephone service profile address is currently valid. If the fourth telephone service profile address is invalid, the second PBX 52 responds by searching the second database 54 for the current address and transmitting the current address to both the third and fourth telephones 50 and 58 for local storage.

Figure 3:
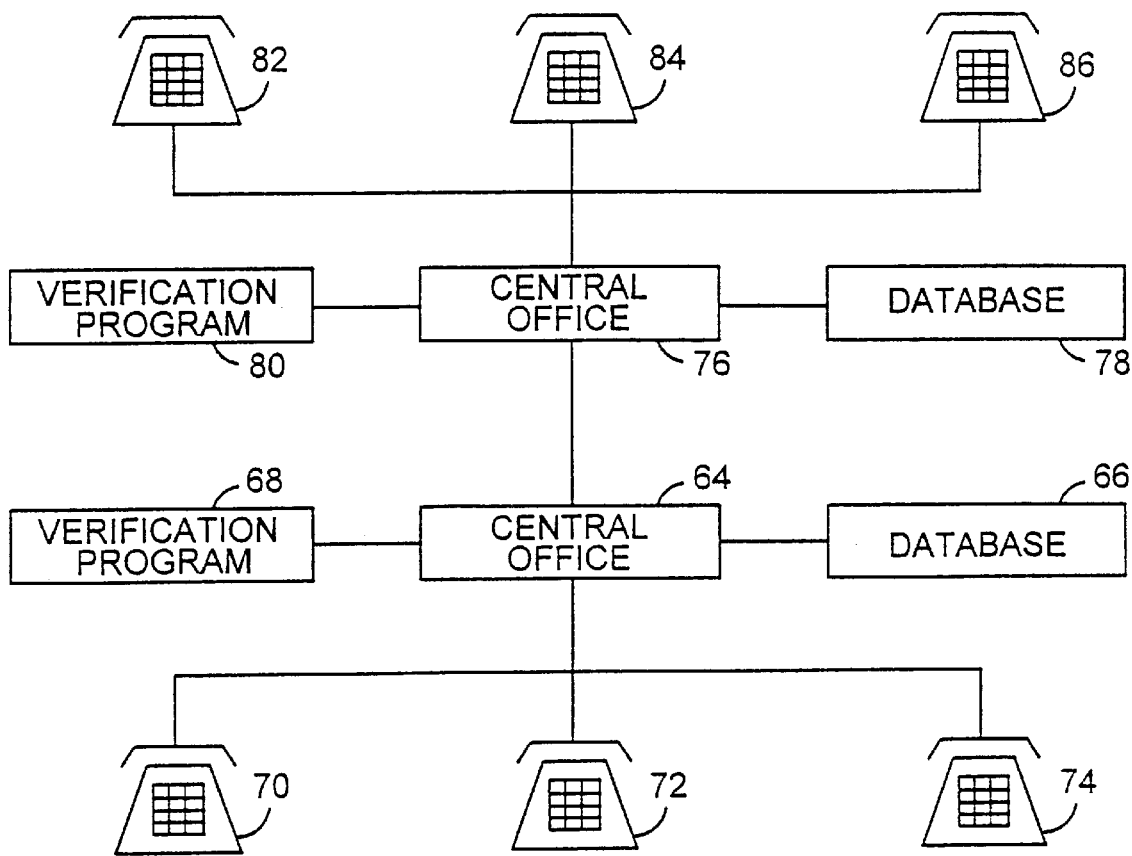
FIG. 3 is a block diagram of an embodiment of the enhanced client identification system supported by a central office of a telephone company.

Referring now to FIG. 3, an embodiment of the system for high efficiency client identification within an integrated services digital network (ISDN) includes a first central office 64 supporting first 70, second 72, and third 74 telephones. The first central office 64 is associated with a first database 66 and a first verification program 68. A second central office 76, supporting fourth 82, fifth 84, and sixth 86 telephones, is associated with a second database 78 and a second verification program 80.

A call placed from the first telephone 70 to the third telephone 74 is used to illustrate how the system allows the first central office 64 to enable the call services of both a local calling telephone and a local called telephone without performing a search for either the first telephone service profile memory-space physical address or the third telephone service profile memory-space physical address. When the first telephone 70 goes off-hook, it transmits a service profile identifier (SPID) to the first central office 64 which includes the first telephone service profile address. The first verification program 68 ascertains that the data which the first central office 64 accesses from the first database 66 in response to the SPID contains the first telephone service profile data. If the address included in the SPID is invalid, the first central office 64 searches the database 66 for the current first telephone service profile address, transmits the current address to the first telephone 70 for local storage, and activates the call services for the first telephone 70 indicated by the first telephone service profile data.

The first telephone 70 transmits a call-setup message to the first central office 64 including a third telephone service profile physical address accessed from local memory on the first telephone 70. The first central office 64 accesses the third telephone service profile from the first database 66 and enables the call services to which the third telephone 74 is subscribed. The first verification program determines whether the third telephone service profile address is valid or if the first central office will have to search for a current address to transmit to the first and third telephones 70 and 74.

A call from the second telephone 72 to the fifth telephone 84 is used to explain how the ISDN embodiment of the system facilitates the enablement of the call services for the fifth telephone 84 without the second central office 76 having to search for the fifth telephone service profile from database 78. The second telephone 72 transmits a call-setup message which includes the physical address of the fifth telephone service profile. The first central office relays the call-setup message and the address with instructions to the second central office 76 to enable the fifth telephone's call services by accessing the fifth telephone service profile using the transmitted address. The second verification program determines whether the fifth telephone service profile address transmitted by the second telephone 72 is valid or whether the second central office 76 must search the database for a current address of the service profile.

Figure 4:
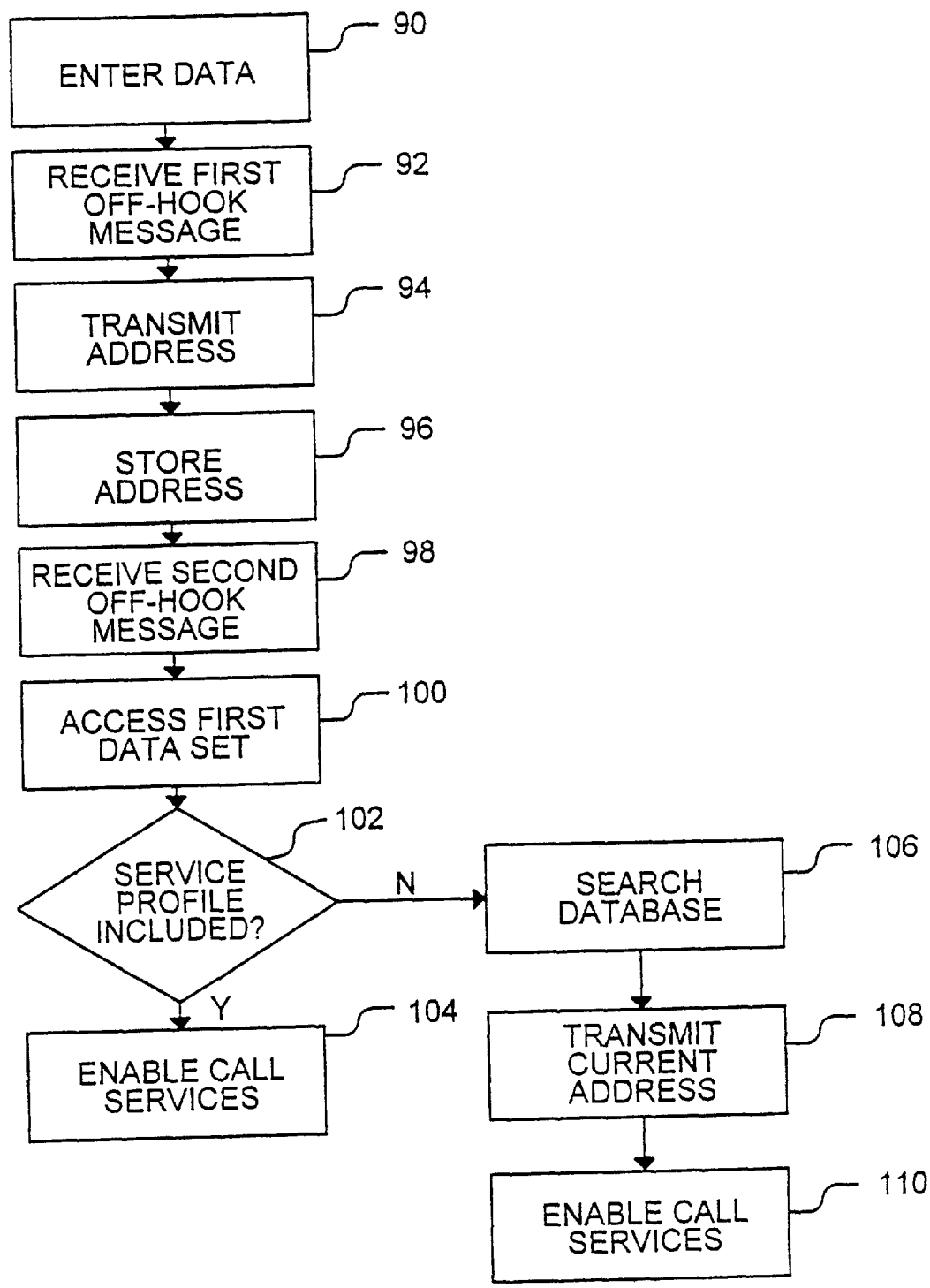
FIG. 4 is a process flow of steps for utilizing the enhanced client identification system of FIGS. 1, 2, or 3 to enable call services in a user communication device utilizing a user service profile address transmitted from the user communication device.

With reference to FIGS. 1 and 4, a method for efficiently enabling call services in a user communication device, such as first the IP-telephony device 18 on the LAN supported by the first router 10, includes a step 90 of entering first device service profile data representative of a first set of call services associated with the first device 18 into the first database of server 14. The first device service profile data is entered upon initialization of the first device 18 for IP-telephony. The first device 18 alerts the first server of an outgoing call by transmitting a first off-hook message received in step 92 by the first router 10. The first router 10 responds to the first off-hook message by performing a search for the address of the first device service profile in the first database of server 14 and transmitting the address to the first device 18 in step 94. The first router 10 uses the address to access the first device service profile from the first database and to enable the first set of call services for the first device in the process of establishing an IP-telephony connection.

In step 96, the first device 18 enters the first device service profile physical address into local memory for transmission to the router 10 in setting up future IP-telephony calls. The first device 18 accesses the address from the local memory and includes the address in a second off-hook message transmitted to the first router 10 in step 98. In step 100, the first router 10 utilizes the address to retrieve a first data set from the database of server 14, which the verification program 12 analyzes in step 102 to determine whether the first device service profile is included therein. If the profile data is included in the first data set, the first router 10 enables the call services for the first device based on the service profile in step 104.

If the database of server 14 has been reconfigured since the first address was transmitted to the first device 18, the first device service profile might have been moved, so that the first data set does not include the profile data. In such an event, the first router 10 performs a search of the database in step 106 to determine a current address of the location in which the first device service profile is presently stored. Upon ascertaining the current address, the first router 10 transmits the current address to the first device 18 in step 108 to replace the invalid address in the first device local memory. The router 10 enables the call services in the first device 18 based on the profile data accessed utilizing the current address in step 1 10.

The method illustrated in FIG. 4 is described above with reference to the IP-telephony embodiment of the client identification system. However, the same steps are followed with respect to the PBX embodiment and the ISDN embodiment of FIGS. 2 and 3.

Figure 5:
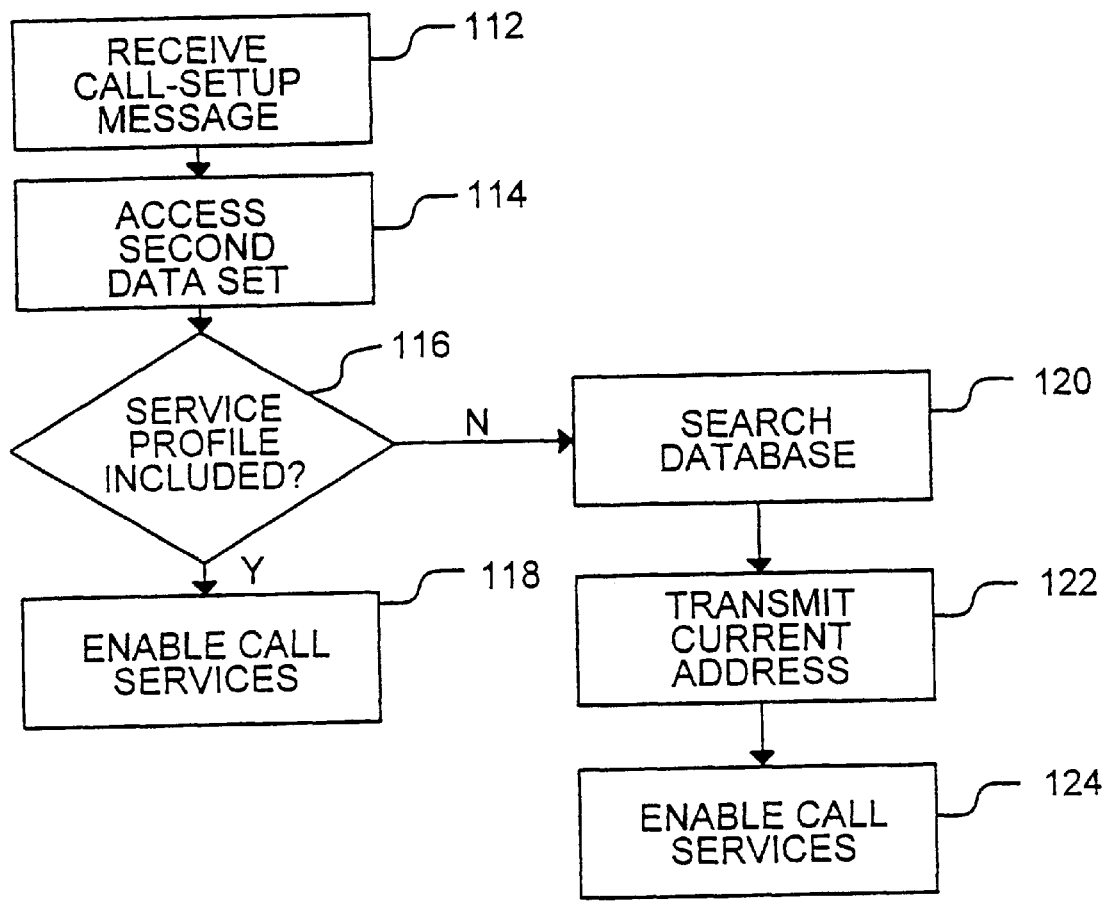
FIG. 5 is a process flow of steps for utilizing the enhanced client identification system of FIGS. 1, 2, or 3 to enable call services of a local communication device utilizing a local communication device service profile address transmitted from the user communication device.

FIG. 5 illustrates a method for enabling call service features in a local second communication device utilizing a second service profile address received from a first communication device. Continuing with the description of the IP-telephony embodiment as an example, after the first router 10 has enabled the call services for the first device in step 104 or step 1 10, the first device 18 accesses the second device service profile address from local memory and transmits a call-setup message that includes the second device service profile address. This message is received by the first router 10 in step 112. The first router 10 responds to the second device service profile address by accessing a second data set in step 114 based on the address. The first verification program 12 analyzes the first data set to determine in step 116 whether the first data set includes the second device service profile. If the second device service profile is included in the second data set, the router 10 enables the call service for the second device 20 in step 118.

Figure 6:
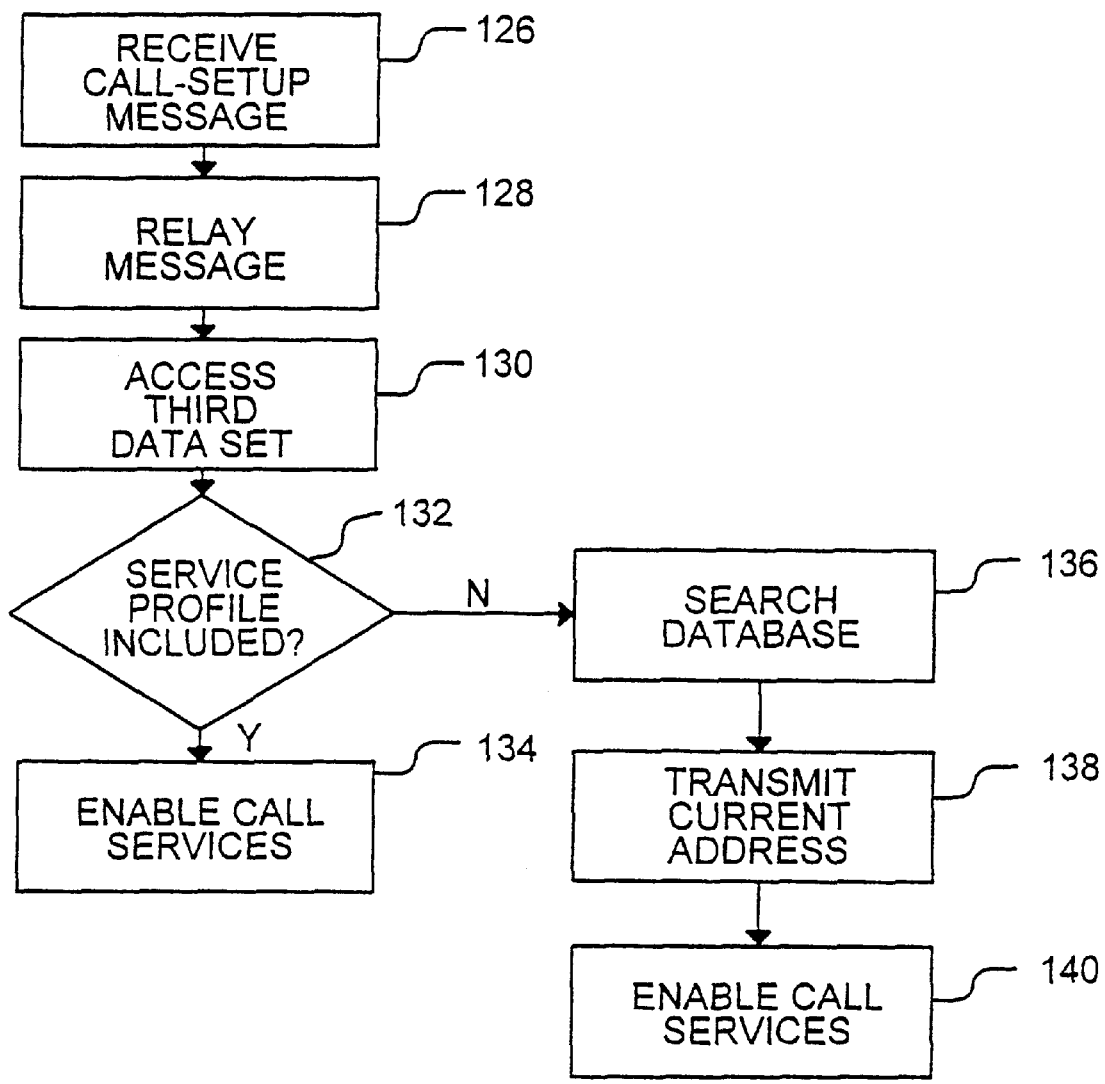
FIG. 6 is a process flow of steps for utilizing the enhanced client identification system of FIGS. 1, 2, or 3 to enable call services of a remotely located communication device utilizing a service profile address transmitted from the user communication device.

If the second data set does not include the second device service profile, the router 10 performs a search for the current address in step 120 and transmits the current address to the first device 18 in step 122. The router 10 then enables the call services for the second device 20 in step 124. FIG. 6 illustrates a method for enabling call services in a remotely located communication device in response to a service profile address associated with the remotely located communication device, after the address has been transmitted from a first communication device. Continuing with the IP-telephony embodiment illustrated in FIG. 1, the first device 18 has the service profile address associated with the fourth device 32 stored in local memory. The first device 18 accesses the fourth device service profile address from local memory and includes the address in a call-setup message transmitted to the first router 10 in step 126. The first router 10 responds to the call-setup message by relaying the message and the address to the second router 24 in step 128, together with instructions directing the second router 24 to utilize the address to enable the call services associated with the fourth device 32. In step 130, the second router 24 utilizes the address to access a third data set which the second verification program 30 analyzes in step 132 to determine if the third data set contains the fourth device service profile. If the fourth device service profile is included in the third data set, in step 134 the second router 24 enables the call services for the fourth device 32.

If the third data set does not include the fourth device service profile, the second router 24 performs a search to determine a current address in step 136. The second router 24 then transmits the current address to the first device 18 in step 138 for storage in local memory, and enables the call services associated with the fourth device in step 140.

Although the methods illustrated in FIGS. 5 and 6 are explained herein with reference to the IP-telephony embodiment of the client identification system, the same steps are followed to employ the client identification system in the ISDN and PBX embodiments.

What is claimed is:

1. A method of accessing information identifying telephony services that are provided to individual communication devices of a plurality of communication devices, said method comprising steps of:
    storing in main memory a plurality of user service profiles. indicative of sets of telephony services assigned to said individual communication devices, each user service profile being specific to one of said communication devices, storage of said user service profiles including entering a first user service profile indicative of telephony services assigned to a first communication device, said first user service profile having a first physical address in memory space of said main memory;
    transmitting said first physical address to said first communication device for storage in second memory remote from said main memory and accessible by operation of said first communication device;
    communicating with said first communication device in response to a request for access to a communications link, including receiving said first physical address;
    accessing data at said first physical address in memory space; and
    enabling telephony services indicated within said accessed data if said accessed data is said first user service profile, thereby enabling said telephony services assigned to said first communication device.

2. The method of claim 1 further comprising steps of:
    verifying that said accessed data at said first physical address is said first user service profile, said verification occurring prior to said step of enabling telephony services;
    if said accessed data is not said first user service profile, searching said main memory for a current physical address of said first user service profile in memory space of said main memory; and
    transmitting said current physical address for storage in said second memory if said current physical address is different than said first physical address.

3. The method of claim 1 further comprising the steps of:
    receiving a second physical address in said memory space from a remotely supported communication device, said second physical address identifying a storage location of a called-party service profile in said main memory, said called-party service profile including information representative of a set of telephony services assigned to a second communication device;
    accessing second data located at said physical address; and
    enabling said set of telephony services for said second communication device based on information contained in said second data if said second data includes said called-party service profile.

4. The method of claim 3 further comprising the steps of:
    determining whether said second data includes said called-party service profile;
    if said second data does not include said called-party service profile, searching said main memory for a current second physical address of said called-party service profile; and
    transmitting said second physical address to said remotely supported communication device.

5. The method of claim I further comprising the steps of:
    receiving a call-setup message from said first communication device, said call-setup message including a memory-space physical address identifying a location of a called-party service profile stored in a remotely located second main memory associated with a remotely located call control unit, said called-party service profile including information regarding telephony services assigned to a remotely located communication device supported by said remotely located call control unit; and
    relaying said call-setup message to said remotely located call control unit with instructions to utilize said memory-space physical address to access said called-party service profile.

6. The method of claim 1 further comprising the step of receiving a first transmission from said first communication device, said step of transmitting said first physical address being a response to said first transmission.

7. The method of claim 1 wherein said step of transmitting said first physical address occurs in response to said step of entering said first user service profile into said main memory.

8. The method of claim 1 further comprising establishing a communication link between said first communication device and a remotely located communication device, said communication link being one of a connection over an ISDN line via a central office, a communication link via a private branch exchange (PBX), and an internet protocol (IP) telephony connection via a local area network.

9. A system for providing client identification comprising:
- means for selectively routing connections for a communications network enabled to provide a plurality of available connectivity services on a device-by-device basis;
- main memory having stored profile data indicative of which set of said available connectivity services is assigned to each individual communication device within said communications network, said data being stored as user service profiles for which each has a physical address in memory space and each has an association with a particular communication device, said means for selectively routing being responsive to access to one of said user service profiles to enable an associated communication device with a set of available connectivity services indicated in said accessed user service profile;
- a plurality of said communication devices operatively connected to said means for selectively routing, each communication device having local memory means for receiving and storing said physical address at which said associated user service profile is stored in said memory space, each communication device being enabled to transmit said stored physical address upon requesting connectivity via said communications network; and
- verification means for verifying that a user service profile accessed in response to receiving one of said physical addresses from a specific communication device is the user service profile associated with said specific communication device, said main memory being a server that is responsive to said verification means to search said main memory for a current physical address of said associated user service profile and to retrieve said associated user service profile from said main memory if said verification means indicates that said physical address does not include said associated user service profile, said retrieval of said associated user service profile triggering transmission of said current physical address to said associated communication device.

10. The system of claim 9 wherein said means for selectively routing and said communication devices are interconnected to form a local area network that supports telephony.

11. The system of claim 9 wherein said means for selectively routing is connected to a remotely located call control unit supporting a called-party communication device, said means for selectively routing being responsive to receipt of a called-party physical address from one of said communication devices, said called-party physical address being associated with a called-party service profile representative of connectivity services assigned to said called-party communication device, receipt of said called-party physical address included in a second call-setup message triggering a relay of said second call-setup message to said remotely located call control unit with instructions to said remotely located call control unit to enable said second set of call services in said called-party communication device utilizing said called-party service profile address.

12. The system of claim 9 wherein means for selectively routing includes a switching arrangement of a private branch exchange (PBX).

13. The system of claim 9 wherein said means for selectively routing includes a switching arrangement of an ISDN central office.

14. A method for providing client identification comprising the steps of:
- receiving a first off-hook message from a user communication device;
- performing a first search for a physical address of memory in which user service profile data is stored, said search being performed in response to said first off-hook message;
- transmitting said physical address to said user communication device with instructions to locally store said physical address in user communication device local memory;
- receiving a second off-hook message including said physical address from said user communication device;
- utilizing said physical address to access a first data set stored at said physical address in said memory;
- determining whether said first data set includes said user service profile data relevant to said user communication device; and
- enabling a first set of call services assigned to said user communication device based on information in said first data set if said first data set includes said relevant user service profile data.

15. The method of claim 14 further comprising the steps of:
- performing a search of said memory for a second physical address for called-party service profile data associated with a called-party communication device;
- transmitting said second physical address to said user communication device with instructions to locally store said second physical address in said user communication device memory;
- receiving said second physical address from said user communication device in a call-setup message;
- utilizing said second physical address to access a second data set from said memory;
- determining whether said second data set includes said called-party service profile data; and
- enabling a second set of call services for said called-party communication device based on said called-party service profile data.

16. A system for providing client identification comprising:
- means for selectively routing connections for a communications network enabled to provide a plurality of available connectivity services on a device-by-device basis;
- main memory having stored profile data indicative of which set of said available connectivity services is assigned to each individual communication device within said communications network, said data being stored as user service profiles for which each has a physical address in memory space and each has an association with a particular communication device, said means for selectively routing being responsive to access to one of said user service profiles to enable an associated communication device with a set of available connectivity services indicated in said accessed user service profile; and
- a plurality of said communication devices operatively connected to said means for selectively routing, each communication device having local memory means for receiving and storing said physical address at which said associated user service profile is stored in said memory space, each communication device being enabled to transmit said stored physical address upon requesting connectivity via said communications network;

wherein said means for selectively routing is responsive to receipt of a first call-setup message including a called-party physical address in said memory space, said means for selectively routing being configured to enable a second set of said available connectivity services assigned to a called-party communication device in response to accessing a called-party service profile stored at said physical address.

\* \* \* \* \*